United States Patent Office 3,177,194
Patented Apr. 6, 1965

3,177,194
ETHYLENE POLYMERIZATION UTILIZING AN INSOLUBLE TITANIUM GEL AS A CATALYTIC COMPONENT
Guido B. Stampa, Plainfield, N.J., assignor to Union Carbide Corporation, a corporation of New York
No Drawing. Filed Oct. 12, 1960, Ser. No. 62,082
12 Claims. (Cl. 260—94.9)

This invention relates to a noncorrosive catalyst and catalytic method for the polymerization of ethylene to normally solid polymers.

Heretofore, it has been known to polymerize ethylene using aluminum alkyl and transition metal halide complexes as polymerization catalysts. These known catalytic compositions, however, liberate a halogen acid, usually hydrochloric acid, when subjected to heat and cause corrosion of process equipment. Also these catalysts have a tendency to discolor the polymer product. As a result it is necessary to remove catalyst residues from the ethylene polymer prior to processing into useful shapes.

It is an object, therefore, of the present invention to provide a catalyst for the polymerization of ethylene to normally solid polymer which catalyst contains no halogen, is noncorrosive and does not have to be removed from the product polymer.

It is another object to provide a catalytic method for polymerizing ethylene to normally solid polymer wherein equipment corrosion is eliminated and the polymer product is not of necessity treated to remove the catalyst residues prior to fabrication.

I have now discovered a catalyst composition which polymerizes ethylene to normally solid polymers and is noncorrosive and nondiscolorative of the product polymer as well.

This catalyst composition contains as the essential elements thereof a hydrocarbon insoluble cross-linked titanium gel characterized by the structure:

(I)
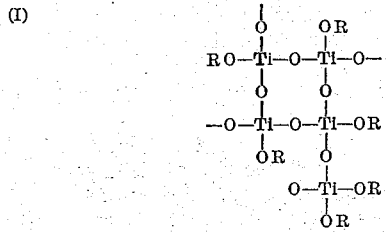

wherein R represents an alkyl group, and wherein there are at least six alkoxy groups (OR) per five titanium atoms, and an hydrocarbon aluminum compound having the formula:

(II)

wherein $R_1$ is hydrogen or a hydrocarbon group free of aliphatic unsaturation and $R_2$ and $R_3$ are hydrocarbon groups free of aliphatic unsaturation.

In accordance with the method of the present invention normally solid ethylene polymers capable of being formed into self-sustaining film and fibers are produced by contacting ethylene with the above catalyst composition in the presence of an inert liquid organic solvent as a reaction medium at super atmospheric pressures.

The hydrocarbon insoluble gel characterized by the structure I above can be prepared by reacting together boric acid and a titanium alkyl ester having the formula:

(III)
$$Ti(OR)_4$$

wherein R is an alkyl group having from 2 to 12 carbon atoms, e.g., ethyl, isopropyl, butyl, tert-butyl, pentyl, hexyl, 2-methylpentyl, heptyl, octyl, 2-ethyhexyl, nonyl, decyl, undecyl and dodecyl groups and preferably from 3 to 8 carbon atoms. The boric acid and titanium alkyl ester are reacted in a ratio of at least 0.9 mole of boric acid per mole of titanium alkyl ester. Preferably the ratio is at least equimolar, with exactly equimolar ratios being particularly preferred. The active catalyst component, i.e. the titanium gel is introduced into the reaction vessel without the usual accompanying halogen; hence, no corrosive halogen acid vapors are formed during polymerization or subsequent processing of the ethylene polymer product. The decomposition of the hydrocarbon-insoluble titanium gel produces only noncorrosive and white, hence nondiscoloring decomposition products.

In a preferred method the gel is formed by heating, suitably at moderate temperatures, e.g., 70–100° C. a solution of the desired titanium alkyl ester with boric acid until gelation occurs. Suitably the titanium alkyl ester containing alkyl groups with from 3 to 8 carbon atoms is dissolved in dimethyl formamide, dioxane or other suitable solvent. Boric acid in an exactly equimolar ratio, i.e., 1.0 mole of boric acid to 1.0 mole of titanium alkyl ester is added to the solution and heating is carried out until a gelled mass is formed. The solvent is stripped from the gel by distillation, e.g., by heating, in vacuo, at 90–100° C. The gel is then dried and ground into a convenient particle size for the polymerization reaction, e.g., 200 to 250 mesh. The grinding can be advantageously carried out in a ball mill or similar device with a benzene or toluene medium to form a slurry of fine reaction product particles.

As stated above, the titanium alkyl esters are compounds having the general formula:

$$Ti(OR)_4$$

wherein R is an alkyl group and has from 2 to 12 and, preferably, from 3 to 8 carbon atoms. Among the titanium alkyl esters, deserving of special mention are tetraisopropyl titanate and tetra-n-butyl titanate because of their ready availability. These titanium alkyl esters can be prepared by several procedures well known in the art. Specifically, the method developed by Cullinane et al. and reported in "Journal Soc. Chem. Ind.," supp. vol. 69, 538 (1950) has been found to be quite practical.

The reaction to produce the gelled catalyst components, simplified and shown for equimolar amounts of boric acid and titanium alkyl ester, proceeds as follows:

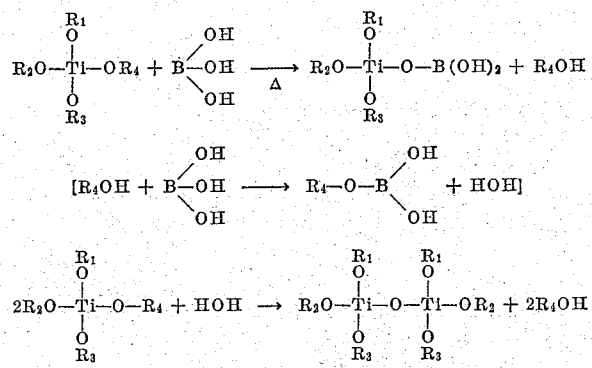

It will be noted that the boric acid reacts with the ester groups of titanium alkyl ester resulting in formation of an alkanol. Although shown for only one —OR group, this reaction occurs on each of the —OR groups. The alkanol formed reacts with the boric acid to form $H_2O$ and this water combines with —OR groups on adjacent titanium alkyl esters to form two moles of alkanol and, as the reaction progresses simultaneously with $R_1$, $R_2$, and $R_3$ as well as $R_4$, the structure:

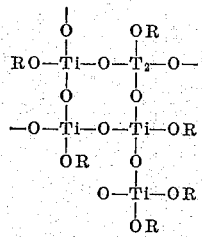

wherein for every five titanium atoms there are at least six of the alkoxy (OR) groups, is formed in a gelled, crosslinked mass. In the above-described gel, the molecules are fixed relative to one another and hence the gel is insoluble. It should be noted that useful gels cannot be obtained using less than 0.9 mole of boric acid per mole of titanium alkyl ester, because the reaction product with molar ratios below about 0.9 are not usually insoluble and sometimes are crystalline materials. Gels prepared with less than 0.9 mole of boric acid are soluble and not effective as catalysts. Molar ratios much above 1.4:1 of boric acid to titanium alkyl ester while providing the insoluble titanium gel are not as desirable as equimolar ratios since they contain an insufficient number of alkoxy groups i.e. less than six for each five titanium atoms and exhibit no catalytic effect. In general, the most desirable amount of boric acid is just the amount sufficient to cause formation of a gelled solid i.e. one which precipitates from and is insoluble in liquid hydrocarbon solvents such as dodecane, and cyclohexane.

In carrying out the method of ethylene polymerization of this invention, the hydrocarbon insoluble titanium gel is mixed preferably in a hydrocarbon liquid slurry, with a hydrocarbon aluminum compound and ethylene monomer is contacted therewith as by bubbling through the reaction medium. The weight ratio of the hydrocarbon aluminum component of the catalyst to the hydrocarbon insoluble titanium gel should be at least 1 to 1. Generally a weight ratio of 2:1 or 4:1 and up to about 10:1 is adequate for polymerization of ethylene to normally solid, film forming polymers. Ratios lower than 2 to 1 provide reduced yields and ratios higher than about 4 to 1 generally offer only slight increases in yield. Excellent yields of high molecular weight ethylene polymers are achieved by using an approximately 3 to 1 weight ratio of the hydrocarbon aluminum compound. Hence, this weight ratio is preferred.

The hydrocarbon aluminum compound of the catalyst composition can be any of the compounds having the formula:

wherein $R_1$ is hydrogen, $R_2$ or $R_3$ and $R_2$ and $R_3$ are the same or different hydrocarbon groups free of aliphatic unsaturation. The specific hydrocarbon groups employed are by no means critical since in the presence of ethylene monomer in the polymerization mixture, the original hydrogen, alkyl or aryl substituents on the aluminum atom, are split off as a part of the first polymer chain produced and are thereafter replaced by ethyl groups, thereby forming triethyl aluminum. Hence, any of the aluminum compounds forming triethyl aluminum under conditions of the reaction are useful in my catalytic method. Practically, $R_2$ and $R_3$ are straight or branch chain alkyl groups having two or more carbon atoms, e.g., ethyl, propyl, iso- propyl, butyl, isobutyl, tert-butyl, n-pentyl, neo-pentyl, n-hexyl, 2-methylpentyl, 3-methylpentyl, 2,3-dimethylbutyl, 2,2-dimethylbutyl, n-heptyl, 2-methylhexyl, 3-methylhexyl, 2,4-dimethylbutyl, 3,3-dimethylpentyl, 2,2,3-trimethylbutyl, n-octyl, 2-ethylhexyl, 3-ethylhexyl, and 2,2,3,3-tetramethylbutyl, dodecyl, eicosyl or phenyl groups; $R_1$ is hydrogen, one of the straight or branch chain alkyl groups such as above described or a phenyl group. The aluminum compounds having from 2 to 8 carbon atoms in the R groups are preferred because of the disproportionate expense involved in using higher homologs, although those groups having a larger number of carbon atoms can be employed successfully. The use of halogen containing aluminum compounds is to be avoided since this introduces undesirable elements into the reaction zone.

The solvent medium can consist of one or a mixture of two or more of those inert organic solvents conventionally used as media for Ziegler type catalysts in ethylene polymerizations. Inert aromatic and saturated aliphatic and alicyclic hydrocarbons liquids have been found to be most suitable, such as benzene, toluene, xylene, cyclohexane, methylcyclohexane, ethylcyclohexane, n-pentane, n-hexane, heptane, isooctane and the like. Reaction temperatures can be from 0 to 75° C. and more, with room temperature, about 25° C. being preferred. Pressures must be above atmospheric for the method of this invention. Pressures ranging from about 20 pounds per square inch to 1000 pounds per square inch are preferred.

To more fully illustrate the preparation of the catalyst compositions of the present invention and their catalytic effectiveness in polymerization of ethylene, the following examples are presented. All parts and percentages are by weight unless otherwise stated.

EXAMPLE 1

A solution of 10 grams of tetraisopropyltitanate in 25 milliliters of dimethylformamide was mixed with 2 grams of boric acid which had also been dissolved in 25 milliliters of dimethylformamide. The mixture was heated on a steam bath at about 90° C. until it gelled. This occurred in 15 minutes. The solvent was stripped from the gel by heating to 100° C. under a pressure of 5 mm. Hg. The stripped gel was dried and weighed. The weight was 12 grams. This amount was mixed with 100 milliliters of benzene and ground in a ball mill to a fineness of about 200–250 mesh. The hydrocarbon insolubility of the gel is shown by the formation of a slurry by grinding in benzene.

To an autoclave equipped with a stirrer and ethylene inlet tube there was added one liter of dry hydrocarbon solvent benzene, 0.75 gram of the hydrocarbon insoluble titanium gel slurry prepared above and 2.3 grams of triisobutyl aluminum in benzene solution. Ethylene was added to the autoclave to give a starting pressure of 500 pounds per square inch gauge. The reaction, without heating, proceeded for five hours during which period no additional ethylene was passed into the autoclave. Pressure was then released and the reaction stopped by the addition of 50 milliliters of ethanol. The product ethylene polymer was separated by filtration, washed with two separate 200 milliliter portions of ethyl alcohol and dried for 24 hours at room temperature. The polyethylene was opaque white, had a wax content of less than 1% as determined by extraction for 24 hours with boiling cyclohexane, and a melt index of zero. Yield was 167 grams. Productivity, defined as grams polymer per grams catalyst, was 56.

EXAMPLES 2–6

The above procedure was followed but with varying ratios of catalyst composition components and various hydrocarbon aluminum compounds. Results including those of Example 1 for comparison are summarized in the table.

| Example | 1 | 2 | 3 | 4 | 5 | 6 |
|---|---|---|---|---|---|---|
| Hydrocarbon-insoluble titanium gel of Example 1 (grams) | 0.75 | 1 | 0.4 | 0.5 | 0.5 | 1 |
| Triisobutyl aluminum (grams) | 2.3 | 2.3 | 2.3 | 1.5 | | |
| Trioctyl aluminum (grams) | | | | | 4.4 | |
| Triethyl aluminum (grams) | | | | | | 1 |
| Yield (grams) | 167 | 170 | 107 | 113 | 133 | 17 |
| Productivity (gram polymer per gram catalyst) | 56 | 51 | 38 | 55 | 27 | 3.5 |

Highest productivities were achieved by an approximately 3 to 1 weight ratio of triisobutyl aluminum to alkyl titanate-boric acid reaction product of Examples 1 and 4.

EXAMPLE 7

A solution of 10 grams of tetrabutyl titanate in 50 milliliters of dioxane was mixed with 2.4 grams of boric acid which had been dissolved in 100 milliliters of dioxane heated to 80–90° C. The mixture was heated as in Example 1 and dried, ground and slurried. Ethylene polymerization was carried out with this gel with substantially equivalent results to those in Examples 1–5.

The products of the above examples were linear high density ethylene polymers useful for a wide variety of objects and adapted to numerous fabricating techniques. It is an important feature of the present invention that the product ethylene polymers can be processed by conventional methods without first treating the polymer to remove catalyst residues. Because the titanium containing component of my catalyst composition contains no halogen, heating the polyethylene with residual catalyst therein does not liberate any corrosive vapors. Further, the decomposition of the hydrocarbon-insoluble titanium gel produces $TiO_2$ and $B_2O_3$, both of which are white and noncorrosive and hence are not required to be removed from the polymer.

What is claimed is:

1. A noncorrosive ethylene polymerization catalyst composition containing as essential elements a hydrocarbon insoluble titanium gel characterized by the structure:

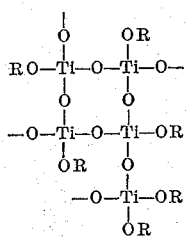

wherein R represents an alkyl group containing from 2 to 12 carbon atoms and wherein there are at least six alkoxy groups per five titanium atoms, and a hydrocarbon aluminum compound having the formula:

$$Al\begin{smallmatrix}R_1\\-R_2\\R_3\end{smallmatrix}$$

wherein $R_1$ is a member selected from the group consisting of hydrogen, $R_2$ and $R_3$, and $R_2$ and $R_3$ are hydrocarbon groups free of aliphatic unsaturation, said elements being present in a weight ratio of from one to ten parts of said aluminum compound per part of said hydrocarbon insoluble titanium gel.

2. A noncorrosive ethylene polymerization catalyst composition containing as essential elements a hydrocarbon insoluble titanium gel characterized by the structure:

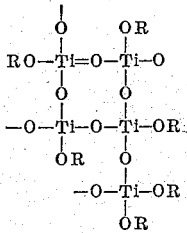

wherein R represents an alkyl group containing from 2 to 12 carbon atoms and wherein there are at least six alkoxy groups per five titanium atoms, and a hydrocarbon aluminum compound having the formula:

$$Al\begin{smallmatrix}R_1\\-R_2\\R_3\end{smallmatrix}$$

wherein $R_1$ is a member selected from the group consisting of hydrogen, $R_2$ and $R_3$, and $R_2$ and $R_3$ are hydrocarbon groups containing from 2 to 8 carbon atoms and free of aliphatic unsaturation, said elements being present in a weight ratio of from 1 to 4 parts of said aluminum compound per part of said hydrocarbon insoluble titanium gel.

3. A noncorrosive ethylene polymerization catalyst composition containing as essential elements, a hydrocarbon insoluble titanium gel characterized by the structure:

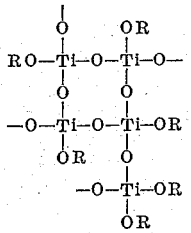

wherein R represents an alkyl group containing from 2 to 12 carbon atoms and wherein there are at least six alkoxy groups per five titanium atoms, and a trihydrocarbon aluminum compound having the formula:

$$Al\begin{smallmatrix}R_1\\-R_2\\R_3\end{smallmatrix}$$

wherein $R_1$, $R_2$, and $R_3$ are hydrocarbon groups containing from 2 to 8 carbon atoms and free of aliphatic unsaturation, said elements being present in a weight ratio of about 3 parts of said aluminum compound per part of said hydrocarbon insoluble titanium gel.

4. A noncorrosive ethylene polymerization catalyst composition containing as essential elements a hydrocarbon insoluble titanium gel characterized by the structure:

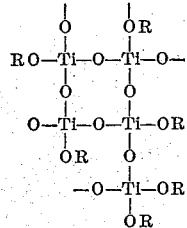

wherein R represents an alkyl group containing from 3 to 8 carbon atoms and wherein there are at least six alkoxy groups per five titanium atoms, and a trihydrocarbon aluminum compound having the formula:

wherein $R_1$, $R_2$, and $R_3$ are hydrocarbon groups containing from two to eight carbon atoms and free of aliphatic unsaturation, said elements being present in a weight ratio of about 3 parts of said aluminum compound per part of said hydrocarbon insoluble titanium gel.

5. The catalyst composition claimed in claim 4 wherein said hydrocarbon aluminum compound is triethyl aluminum.

6. The catalyst composition claimed in claim 4 wherein said hydrocarbon aluminum compound is trioctyl aluminum.

7. The catalyst composition claimed in claim 4 wherein said hydrocarbon aluminum compound is triisobutyl aluminum.

8. A hydrocarbon insoluble titanium gel characterized by the structure:

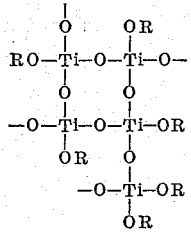

wherein R represents an alkyl group containing from 2 to 12 carbon atoms and wherein there are at least six alkoxy groups per five titanium atoms.

9. A method for producing polyethylene free of corrosive compounds comprising contacting ethylene under polymerization conditions with a catalyst containing as essential elements a hydrocarbon insoluble titanium gel characterized by the structure:

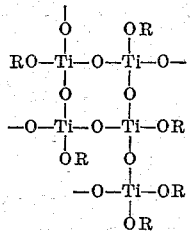

wherein R represents an alkyl group having from 2 to 12 carbon atoms and wherein there are at least six alkoxy groups per five titanium atoms and a hydrocarbon aluminum compound having the formula:

wherein R is a member selected from the group consisting of hydrogen, $R_2$ and $R_3$, and $R_2$ and $R_3$ are hydrocarbon groups free of aliphatic unsaturation, said elements being present in a weight ratio of from 1 to 10 parts of said aluminum compound per part of said hydrocarbon insoluble titanium gel and recovering the polymer produced.

10. Method for producing polyethylene free of corrosive compounds comprising contacting ethylene under polymerization conditions with a catalyst containing as essential elements a hydrocarbon insoluble titanium gel characterized by the structure:

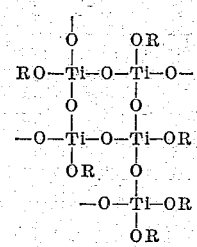

wherein R represents an alkyl group having from 3 to 8 carbon atoms and wherein there are at least six alkoxy groups per five titanium atoms and a hydrocarbon aluminum compound having the formula:

wherein $R_1$ is a member selected from the group consisting of hydrogen, $R_2$ and $R_3$, and $R_2$ and $R_3$ are hydrocarbon groups containing from 2 to 8 carbon atoms and free of aliphatic unsaturation, said elements being present in a weight ratio of from 1 to 4 parts of said aluminum compound per part of said hydrocarbon insoluble titanium gel.

11. Method for producing polyethylene free of corrosive compounds comprising contacting ethylene under polymerization conditions with a catalyst containing as essential elements a hydrocarbon insoluble titanium gel characterized by the structure:

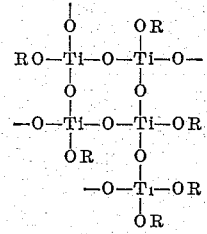

wherein R represents an alkyl group having from 3 to 8 carbon atoms and wherein there are at least six alkoxy groups per five titanium atoms and a trihydrocarbon aluminum compound having the formula:

wherein $R_1$, $R_2$ and $R_3$ are hydrocarbon groups containing from 4 to 8 carbon atoms and free of aliphatic unsaturation, said elements being present in a weight ratio of about 3 parts of said aluminum compound per part of said hydrocarbon insoluble titanium gel.

12. Method for producing polyethylene free of corrosive compounds comprising contacting ethylene under polymerization conditions with a catalyst containing as essential elements a hydrocarbon insoluble titanium gel characterized by the structure:

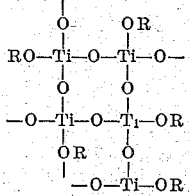

wherein R is an alkyl group having from 3 to 4 carbon atoms and wherein there are at least six alkoxy groups per five titanium atoms and triethyl aluminum said elements being present in a weight ratio of about 3 parts of said triethyl aluminum per part of said hydrocarbon insoluble titanium gel.

References Cited by the Examiner
UNITED STATES PATENTS

| | | | |
|---|---|---|---|
| 2,621,193 | 12/52 | Langkammerer | 260—429.5 |
| 2,862,917 | 12/58 | Anderson et al. | 260—94.9 |
| 2,936,302 | 5/60 | Jones et al. | 260—93.7 |
| 2,962,490 | 11/60 | Edmonds et al. | 260—94.9 |

OTHER REFERENCES

Minami and Ishino, Chem. Abstracts 50, 15204 (1956).
Minami and Ishino Chem. Abstracts 50, 3218 (1956).

JOSEPH L. SCHOFER, *Primary Examiner*.

L. H. GASTON, *Examiner*.